(12) United States Patent
Draeger et al.

(10) Patent No.: US 10,012,750 B2
(45) Date of Patent: Jul. 3, 2018

(54) DEVICE AND METHOD FOR MONITORING ACCESS TO A STORAGE AREA OF A PLURALITY OF STORAGE AREAS FOR GOODS

(71) Applicant: Fraunhofer-Gesellschaft zur Foerderung der angewandten Forschung e.V., Munich (DE)

(72) Inventors: Tobias Draeger, Baiersdorf (DE); Roland Fischer, Kersbach (DE); Iker Mayordomo, Erlangen (DE); Christine Gundelfinger, Igensdorf (DE); Markus Hartmann, Sulzbach-Rosenberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 350 days.

(21) Appl. No.: 15/004,588

(22) Filed: Jan. 22, 2016

(65) Prior Publication Data

US 2016/0139288 A1    May 19, 2016

Related U.S. Application Data

(63) Continuation of application No. PCT/EP2014/065535, filed on Jul. 18, 2014.

(30) Foreign Application Priority Data

Jul. 22, 2013   (DE) .................. 10 2013 214 283

(51) Int. Cl.
G08B 13/22      (2006.01)
G01V 3/10       (2006.01)
(Continued)

(52) U.S. Cl.
CPC ............... *G01V 3/10* (2013.01); *G01D 5/204* (2013.01); *G01D 7/00* (2013.01); *G01V 3/104* (2013.01); *G06Q 10/087* (2013.01); *B65G 1/137* (2013.01)

(58) Field of Classification Search
CPC ...... B65G 1/02; B65G 1/10485; B65G 1/137; B65G 1/16; G01D 5/12; G01D 5/14;
(Continued)

(56) References Cited

U.S. PATENT DOCUMENTS

| | | | |
|---|---|---|---|
| 4,467,421 A * | 8/1984 | White | G06F 3/0613 711/118 |
| 5,117,096 A | 5/1992 | Messerschmitt Boelkow Blohm | |
| 2009/0290249 A1* | 11/2009 | Makino | G06F 11/0727 360/31 |

FOREIGN PATENT DOCUMENTS

| | | |
|---|---|---|
| EP | 0433756 | 6/1991 |
| FR | 2880746 A1 | 7/2006 |

(Continued)

*Primary Examiner* — Van Trieu
(74) *Attorney, Agent, or Firm* — Perkins Coie LLP; Michael A. Glenn

(57) ABSTRACT

Embodiments of the present invention provide a device for monitoring access to a storage area of a plurality of storage areas for goods, including a measurement signal generation, detection, and evaluator. The measurement signal generator includes a signal source and a conductor loop arrangement, the detector for detecting the generated magnetic field is configured to provide a measurement signal on the basis of the detected magnetic field, and the evaluator for evaluating the measurement signal is configured to determine an instance of access to one of the storage areas on the basis of the measurement signal, to compare a determined instance of access with a target access instance, and to output a display signal on the basis of the comparison.

18 Claims, 14 Drawing Sheets

(51) Int. Cl.
*G01D 5/20* (2006.01)
*G01D 7/00* (2006.01)
*G06Q 10/08* (2012.01)
*B65G 1/137* (2006.01)

(58) Field of Classification Search
CPC ........ G01D 5/142; G01D 5/20; G01D 5/2006;
G01D 5/2033; G01D 5/204; G01D 5/22;
G01D 7/00; G01D 7/002; G01D 7/04;
G01F 7/02; D01D 7/08; G01V 3/10;
G01V 3/104; G01V 3/18; G01V 3/20;
G01V 3/26
See application file for complete search history.

(56) References Cited

FOREIGN PATENT DOCUMENTS

| | | |
|---|---|---|
| JP | 2007148995 A | 6/2007 |
| WO | 9416421 A1 | 7/1994 |
| WO | 2007097752 A1 | 8/2007 |
| WO | 2009046722 A1 | 4/2009 |

\* cited by examiner

DEVICE AND METHOD FOR MONITORING ACCESS TO A STORAGE AREA OF A PLURALITY OF STORAGE AREAS FOR GOODS

CROSS-REFERENCE TO RELATED APPLICATIONS

This application is a continuation of copending International Application No. PCT/EP2014/065535, filed Jul. 18, 2014, which is incorporated herein by reference in its entirety, and additionally claims priority from German Application No. 10 2013 214 283.8, filed Jul. 22, 2013, which is incorporated herein by reference in its entirety.

BACKGROUND OF THE INVENTION

Embodiments of the present invention relate to a device for monitoring access to a storage area of a plurality of storage areas for goods. Further embodiments relate to a method of monitoring access to a storage area of a plurality of storage areas for goods. Some embodiments relate to an electronic order-picking aid with area monitoring.

Order-picking is the central function of logistics and has a significant influence on other divisions of a company such as production or distribution. Order-picking is understood to mean compiling of individual items (partial quantities) among a total quantity (range of products) on account of requests (order). Order-picking takes place at different points in a logistics chain. For example, within a company, there may be order-picking between a storage area and production so as to ensure optimum supply of material in manufacturing and assembly.

When goods and objects among the total quantity (e.g. stock on hand) are picked or sorted as individual items, it is human resources that are mostly drawn on even in high-wage countries on account of the complex gripping task involved in retrieving and depositing objects to be picked.

In this context, an individual item (partial quantity, retrieval unit) is retrieved among the total quantity (range of products) of many different articles stored in storage areas (staging units) and is set up as a new combination in accordance with the order.

An order-picker will act in accordance with the order data provided to him/her.

In this context, there are different systems both for provision of information (i.e. what is to be picked) and for error monitoring.

As with all manual processes, errors may occur in order-picking. Said errors may be categorized into four groups of errors, for example (type error, omission error, state error, and quantity error).

In order to support order-picking, i.e. to support avoidance of errors in and to accelerate order-picking, specification systems may be employed which indicate to the order-picker the storage area (place of retrieval) from which the product is to be retrieved. The shared weakness of the specification systems is the lacking verification of the specifications made.

One system is known wherein the order-picker wears an RFID reader with an antenna in the form of a watch on his/her wrist. The storage locations have RFID transponders mounted thereat which the order-picker are expected to come very close to with his/her "watch" for a specific time period in each case for confirmation purposes. The system has the decisive disadvantage of interference with the order-picking process. Even though the order-picker may reduce errors here, he/she is expected to perform specific movements that are not part of his/her natural flow of movements.

In summary, known solutions heavily interfere with the operational procedures and/or with the order-picker's personal comfort. The order-pickers (performing persons) are partly obliged to keep to, or learn, a specific sequence of actions in order to use the provided technical support in performing their tasks. The accompanying electronic setup also may utilize a structural change in the storage organization and lays down specifications for the internal design of the storage room.

SUMMARY

According to an embodiment, a device for monitoring access to a storage area of a plurality of storage areas for goods may have: a measurement signal generator including a signal source and a conductor loop arrangement, the conductor loop arrangement being arranged to generate a magnetic field on account of an electrical AC signal, each of the storage areas having at least one conductor loop of the conductor loop arrangement associated with it, and the signal source being configured to supply a characteristic electrical AC signal to each conductor loop of the conductor loop arrangement; a detector for detecting the generated magnetic field and for providing a measurement signal on the basis of the detected magnetic field; and an evaluator for evaluating the measurement signal provided by the detector, the evaluator being configured to determine an instance of access to one of the storage areas on the basis of the measurement signal, to compare a determined instance of access with a target access instance, and to output a display signal on the basis of the comparison.

According to another embodiment, a method of monitoring access to a storage area of a plurality of storage areas for goods, wherein each storage area has at least one conductor loop of a conductor loop arrangement associated with it, the conductor loop arrangement being arranged to generate a magnetic field on account of an electrical AC signal, may have the steps of: supplying a characteristic electrical AC signal to each conductor loop of the conductor loop arrangement so as to generate the magnetic field; detecting the magnetic field and providing a measurement signal on the basis of the detected magnetic field; and evaluating the provided measurement signal so as to determine an instance of access to one of the storage areas on the basis of the measurement signal, to compare a determined instance of access to a target access instance, and to output a display signal on the basis of the comparison.

According to another embodiment, a non-transitory digital storage medium may have computer-readable code stored thereon to perform the inventive method, when said storage medium is run by a computer.

Embodiments of the present invention provide a device for monitoring access to a storage area of a plurality of storage areas for goods. The device comprises a measurement signal generation means, a detection means, and an evaluation means. The measurement signal generation means comprises a signal source and a conductor loop arrangement, the conductor loop arrangement being arranged to generate a magnetic field on account of an electrical AC signal, each of the storage areas having at least one conductor loop of the conductor loop arrangement associated with it, and the signal source being configured to supply an electrical AC signal to each conductor loop of the conductor loop arrangement. The detection means for detecting the generated magnetic field is configured to provide a measurement signal on the basis of the detected magnetic field. The evaluation means for evaluating the measurement signal is configured to determine an instance of access to one of the storage areas on the basis of the measurement signal, to compare a determined instance of access with a target access instance, and to output a display signal on the basis of the comparison.

Further embodiments provide a method of monitoring access to a storage area of a plurality of storage areas for goods. In this context, each storage area has at least one conductor loop of a conductor loop arrangement associated with it, the conductor loop arrangement being arranged to generate a magnetic field on account of an electrical AC signal. The method includes supplying an electrical AC signal to each conductor loop of the conductor loop arrangement so as to generate the magnetic field. The method further includes detecting the magnetic field and providing a measurement signal on the basis of the detected magnetic field. The method further includes evaluating the measurement signal provided so as to determine an instance of access to one of the storage areas on the basis of the measurement signal, to compare a determined instance of access with a target access instance, and to output a display signal on the basis of the comparison.

The present invention exploits the effect that a conductor loop through which current flows generates a magnetic field which can be detected by a detection means (e.g. a measuring coil) so as to monitor access to a storage area of a plurality of storage areas in that each of the storage areas has at least one conductor loop associated with it and each of the conductor loops has a (characteristic) AC signal supplied to it.

During an instance of access to one of the storage areas, the detection means detects the magnetic field generated by the conductor loop associated with the storage area, and on the basis of the detected magnetic field, said detection means provides a measurement signal on the basis of which the evaluation means can monitor the instance of access to the storage area.

In embodiments, the detection means may comprise a measuring coil, for example, into which a voltage is induced by the magnetic field generated by the conductor loop. By means of a phase position of the voltage induced into the measuring coil, access to one of the storage areas may be determined and/or verified.

For example, one may identify by means of the phase position whether or not a conductor loop has been crossed through with the detection means, or, in other words, whether or not a surface (or plane or entrance plane) spanned by the conductor loop and spatially demarcated by the conductor loop has been penetrated or passed with the detection means. Thus, one may determine by means of the phase position whether the order-picker (on whose hand or arm the detection means may be attached) has reached into the (correct) storage area associated with the conductor loop (or encompassed by the conductor loop). Moreover, one may determine by means of the phase position whether the order-picker has not reached into (correct) storage area, i.e. has missed the correct storage area or has reached into another (wrong) storage area.

In addition, one may identify by means of the phase position whether the detection means has crossed over a conductor loop or a part or portion of the conductor loop. Crossing-over here relates to a movement by the detection means along a direction of motion or trajectory which does not intersect the plane spanned by the conductor loop, e.g. to a movement along a direction of motion or trajectory that extends essentially in parallel with the plane.

When the conductor loop includes or encompasses a storage area for goods and when the detection means comprises a measuring coil for detecting the magnetic field generated by the conductor loop and is attached to a hand or an arm of the order-picker, it will be possible to make a statement about whether the detection means has crossed over part of the conductor loop associated with the storage area, and thus, whether or not an instance of access to said storage area has taken place.

Thus, while doing his/her work, the order-picker can obtain direct feedback concerning the correct process flow with regard to the place of retrieval and possibly the place of deposition of the goods. In this manner, erroneous order-picking can be identified and be signaled before the order-picking process is completed. The display signal may be an optical, acoustic, or haptic/mechanical one. Signaling may be performed such that it does not change or disturb the actual process flow. If no error is detected, the order-picker will ideally forget about the presence of the device for monitoring access to a storage area of a plurality of storage areas for goods.

Moreover, the position of the detection means (or of a mobile terminal comprising the detection means) in relation to the current-carrying conductor or conductor loop may be determined in absolute terms. As a result it is possible to perform precise evaluations of positions on the basis of radio technology without requiring further reference signals. In particular, this can be used for verifying, during order-picking, whether or not the order-picker has reached into the correct storage area.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
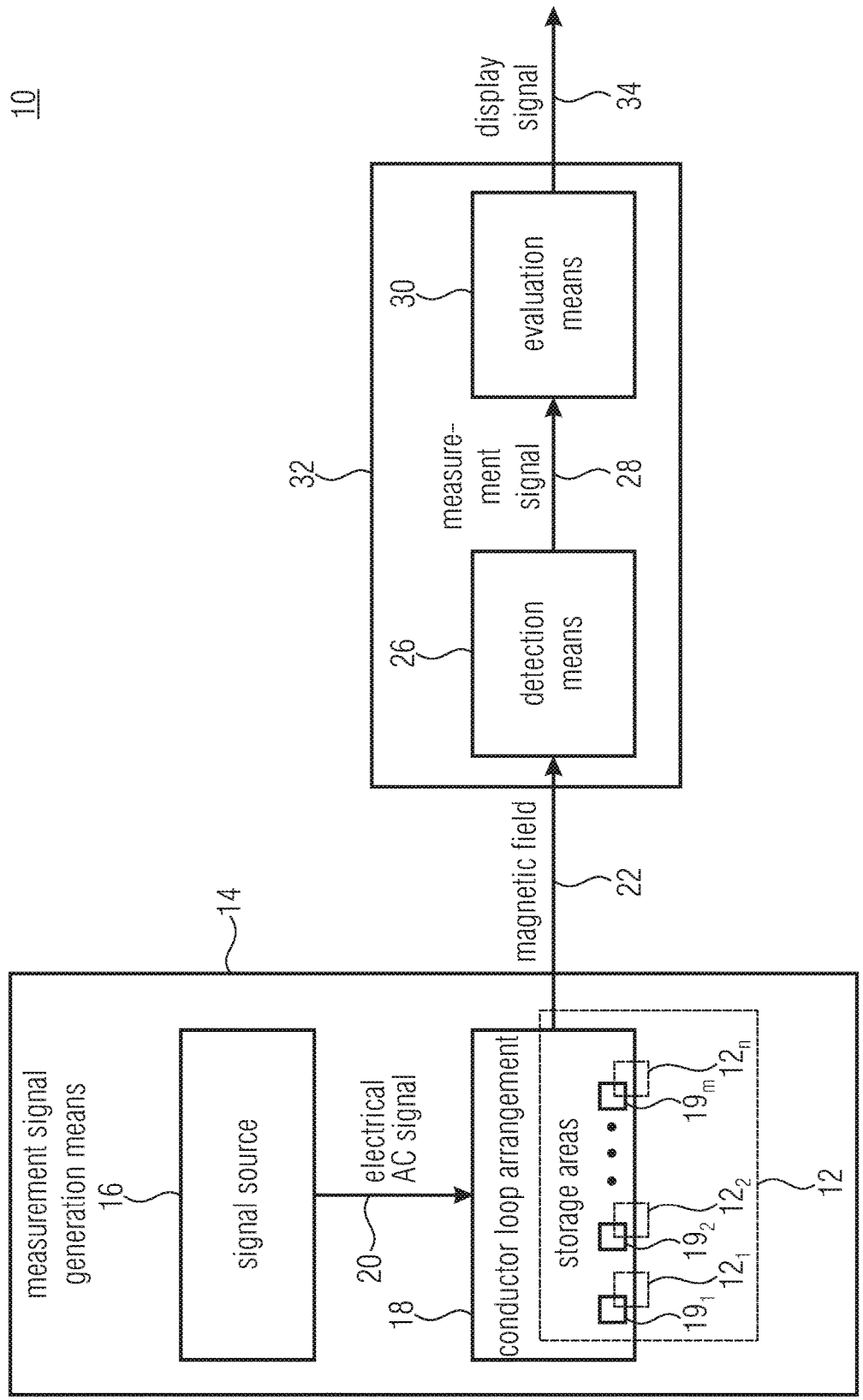
FIG. 1 shows a schematic block diagram of a device for monitoring access to a storage area of a plurality of storage areas for goods, in accordance with an embodiment.

In the following description of the embodiments of the invention, elements that are identical or have identical actions will be provided with the same reference numerals in the figures, so that their descriptions in the different embodiments are interchangeable.

FIG. 1 shows a schematic block diagram of a device 10 for monitoring access to a storage area of a plurality of storage areas 12 for goods. The device 10 comprises measurement signal generation means 14, detection means 26, and evaluation means 30.

The measurement signal generation means 14 comprises a signal source 16 and a conductor loop arrangement 18 comprising a plurality of conductor loops $19_1$ to $19_m$, the conductor loop arrangement 18 being arranged to generate a magnetic field 22 on the basis of an electrical AC signal 20, each of the storage areas $12_1$ to $12_n$ having at least one of the conductor loops $19_1$ to $19_m$, of the conductor loop arrangement 18 associated with it, and the signal source 16 being configured to supply an electrical AC signal 20 to each conductor loop $19_1$ to $19_m$, of the conductor loop arrangement 18.

The detection means 26 for detecting the generated magnetic field 22 is configured to provide a measurement signal 28 on the basis of the detected magnetic field 22.

The evaluation means 30 for evaluating the measurement signal 28 is configured to determine an instance of access to one of the storage areas 12 on the basis of the measurement signal 28, to compare a determined instance of access with a target access instance, and to output a display signal 34 on the basis of the comparison.

In embodiments, the device 10 may monitor up to n storage areas $12_1$ to $12_n$, n being a natural number larger than one, n≥1. To this end, the device 10 may comprise a conductor loop arrangement 18 comprising up to m conductor loops $19_1$ to $19_m$, m being a natural number larger than one, m ≥1, it being possible for each of the storage areas $12_1$ to $12_n$ to have at least one of the conductor loops $19_1$ to $19_m$, associated with it.

In embodiments, at least two of the conductor loops $19_1$ to $19_m$, of the conductor loop arrangement 18 may have different AC signals associated with them.

For example, the signal source 16 may be configured to supply a specific, or characteristic, electrical AC signal 20 to each of the conductor loops $19_1$ to $19_m$. Because of the specific, or characteristic, electrical AC signals 20, specific, or characteristic, magnetic fields 22 may be generated, which may be distinguished from one another (e.g. by the evaluation means 30) by their signal shapes.

In other words, each of the storage areas $12_1$ to $12_n$ may have at least one of the conductor loops $19_1$ to $19_m$, of the conductor loop arrangement 18 associated with it, each of the conductor loops $19_1$ to $19_m$, obtaining a specific electrical AC signal 20 from the signal source 16. This specific electrical AC signal 20 generates a specific magnetic field 22. I.e., the generated magnetic field 22 is dependent on the specific electrical AC signal 20 associated with the respective conductor loop. In this manner, it is possible to associate a magnetic field 22 with one of the conductor loops $19_1$ to $19_m$, and, thus, with one of the storage areas $12_1$ to $12_n$.

As can be seen in FIG. 1, the device 10 may comprise a mobile terminal 32 which includes the detection means 26 and the evaluation means 30. In other words, the detection means 26 and the evaluation means 30 may be integrated or implemented within one mobile terminal 32.

In addition, it is possible for the mobile terminal 32 to comprise the detection means 26, while the evaluation means 30 is implemented within an (external) unit. In this context, the measurement signal 28 may be transmitted from the detection means 26 to the evaluation means 30 via a tethered link (e.g. via an electrical or optical cable) or a wireless link (e.g. via a radio link or infrared link).

In embodiments, the display signal 34 may indicate whether the determined instance of access and the target access instance coincide. Moreover, the display signal 34 may indicate whether the determined instance of access and the target access instance do not coincide. Of course, the display signal 34 may also indicate both, i.e. whether the determined instance of access and the target access instance coincide or do not coincide.

In this context, the display signal 34 may indicate a first state when the comparison shows that the target access instance and the detected access instance coincide, and/or may indicate a second state when the comparison shows that the target access instance and the detected access instance do not coincide.

The display signal 34 may be output in any form desired. For example, the device 10 may comprise an optical display unit which can indicate the first state and/or the second state. For example, the optical display unit may indicate the first state by a first color (e.g. green), and/or may indicate the second state by a second color (e.g. red). In addition, the device 10 may comprise a display unit which may be configured to indicate the display signal 34 in an acoustic, haptic, and/or mechanical manner. In this context it is also possible to indicate only specific events such as inappropriate access instances, for example.

The display unit may be arranged on the mobile terminal 32. The display signal 34 may also be processed further (e.g. by an external data processing means) and/or stored so as to be able to perform statistical evaluation, for example.

Figure 2:
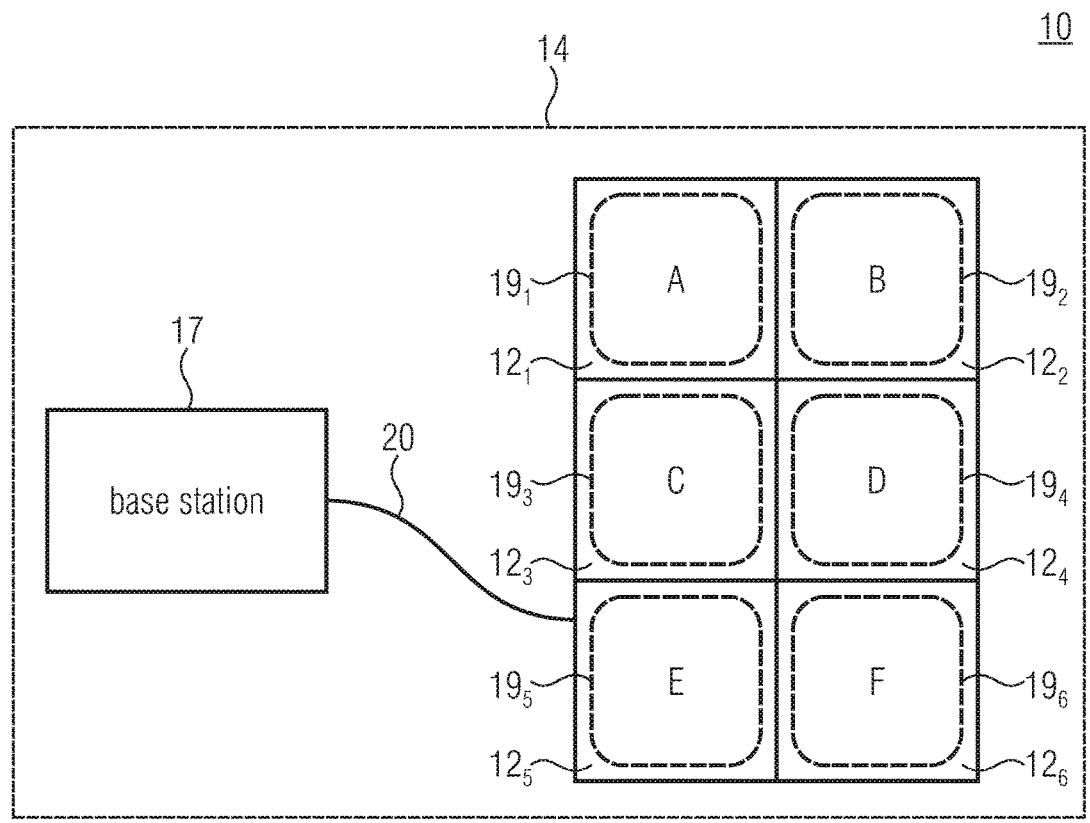
FIG. 2 shows a schematic view of the device, shown in FIG. 1, for monitoring access to a storage area of a plurality of storage areas for goods, in accordance with an embodiment.
Figure 2:
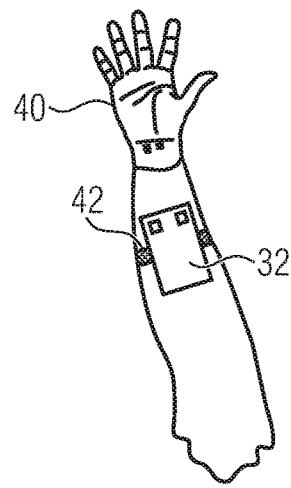

FIG. 2 shows a schematic view of the device 10, shown in FIG. 1, for monitoring access to a storage area of a plurality of storage areas 12 for goods. By way of example, the conductor loop arrangement 18 comprises six conductor loops $19_1$ to $19_m$, (m=6) for monitoring six storage areas (e.g. shelves) $12_1$ to $12_n$ (n=6). The six storage areas $12_1$ to $12_n$ (n=6) are designated by "A" to "F" in FIG. 2.

However, it shall be noted that in embodiments, the conductor loop arrangement 18 may comprise up to m conductor loops $19_1$ to $19_m$, m being a natural number larger than one, m≥1. In this context, each storage area of the plurality of storage areas $12_1$ to $12_n$ that is to be monitored may have at least one of the conductor loops $19_1$ to $19_m$, associated with it or assigned to it, for example in that the at least one conductor loop encloses or encompasses the corresponding storage area.

In FIG. 2, one conductor loop of the six conductor loops $19_1$ to $19_m$, (m=6) is associated with one storage area of the six storage areas $12_1$ to $12_n$ (n=6) in each case. The conductor loops $19_1$ to $19_m$, (m=6) may be arranged around the storage areas (e.g. shelves) $12_1$ to $12_n$ (n=6).

For example, a first conductor loop $19_1$ of the six conductor loops $19_1$ to $19_m$, (m=6) is associated with a first storage area $12_1$ of the six storage areas $12_1$ to $12_n$ (n=6), whereas a second conductor loop $19_2$ of the six conductor loops $19_1$ to $19_m$, (m=6) is associated with a second storage area $12_2$ of the six storage areas $12_1$ to $12_n$ (n=6).

The device 10 may further comprise a base station 17 which includes the signal source 16 (see FIG. 1) and is configured to generate one or more AC signals 20 at a frequency $f_g$ for the six conductor loops $19_1$ to $19_m$, (m=6). For example, the signal source 16 (of the base station 17) may be configured to generate six (characteristic, or specific) AC signals for the six conductor loops $19_1$ to $19_m$, (m=6) of the conductor loop arrangement 18, so that each of the six conductor loops $19_1$ to $19_m$, (m=6) obtains one AC signal of the six AC signals.

The mobile terminal 32 (or receiver system) may be arranged on an arm 40 of the order-picker (or operator). In addition, the device 10 may comprise a display device, or signaling device, 42 which may be connected to the mobile terminal 32, for example.

As is shown in FIG. 2, the mobile device 32 may be attached to an arm 40 of the order-picking person, so that during seizing of the goods from one of the storage areas 12 or depositing of the goods into one of the storage areas 12, the mobile terminal 32 is positioned in the vicinity of the corresponding storage area as far as to possible and detects the magnetic field which is generated by the conductor loop of the conductor loop arrangement 18 associated with the corresponding storage area. To this end, the mobile terminal 32 may be configured as a watch, for example, or may be integrated into a glove or a piece of clothing of the executing person.

The device 10 for monitoring access to a storage area of a plurality of storage areas 12 for goods may be configured to verify an instance of reaching into at least one storage area of the storage areas $12_1$ to $12_n$ (n=6). When reaching into the at least one storage area of the storage areas $12_1$ to $12_n$ (n=6), the conductor loop associated with the at least one storage area of the storage areas $12_1$ to $12_n$ (n=6) is crossed through, or reached through, along with the detection means 26. The storage areas $12_1$ to $12_n$ (n=6) may be shelves of a rack, for example, at least one of the storage areas (e.g. one of the shelves) having a conductor loop associated with it such that the latter is crossed through or reached through during access to the storage area (e.g. the shelf). To this end, the conductor loop may be arranged, for example, around a storage area opening (e.g. shelf opening) through which the access to the storage area (e.g. the shelf) occurs, or may encompass same. The device 10 here may verify the instance of access to the storage area by determining whether the order-picker has reached into the correct storage area along with the detection means 26 and by doing so has crossed through, or reached through, the conductor loop associated with said storage area, or whether the order-picker has missed the correct storage area and has thus reached into a different one of the storage areas $12_1$ to $12_n$ (n=6). If the other storage areas also have conductor loops associated with them, the device 10 can additionally determine which of the storage areas $12_1$ to $12_n$ (n=6) the order-picker has reached into by mistake.

For example, the goods to be order-picked may be located within the third storage area $12_3$. In this case, the target access instance corresponds to an access to the third storage area $12_3$. To verify the access to the third storage area $12_3$, the latter may have the third conductor loop $19_3$ associated with it such that said conductor loop $19_3$ is crossed through, or reached through, during access to the third storage area $12_3$. Thus, the device 10 can verify access to the third storage area $12_3$ by determining whether the detection means 26 crosses through the third conductor loop $19_3$ and whether the order-picker has thus reached into the third storage area $12_3$, or whether the detection means 26 has not crossed through the third conductor loop $19_3$ and whether the order-picker thus has reached into a different one of the storage areas $19_1$ to $19_2$ and $19_4$ to $19_n$ (n=6). If the other storage areas $19_1$ to $19_2$ and $19_4$ to $19_n$ (n=6) also have conductor loops associated with them, the device 10 may additionally determine which of the storage areas $19_1$ to $19_2$ and $19_4$ to $19_n$ (n=6) the order-picker has reached into by mistake.

It shall be noted that at least one conductor loop may be associated with a storage area of the storage areas $12_1$ to $12_n$ (n=6) also in such a manner that the conductor loop is crossed over rather than crossed through during access to the storage area. To this end, the conductor loop may be arranged at a bottom of the storage areas (e.g. shelves), for example. The device 10 may verify access to the storage area by determining whether the order-picker has crossed over the conductor loop along with the detection means 26 and has thus reached into the correct storage area, or whether the order-picker has not crossed over the conductor loop along with the detection means 26 and thus has missed the correct storage area and has reached into a different one of the storage areas $12_1$ to $12_n$ (n=6). If the other storage areas also have conductor loops associated with them, the device 10 may additionally determine into which of the storage areas $12_1$ to $12_n$ (n=6) the order-picker has reached by mistake.

In other words, the device (e.g. system) 10 includes at least one base station 17, one or more conductor loops $19_1$ to $19_m$, and at least one receiver system 32. Containers, bins or racks $12_1$ to $12_n$ with the goods to be order-picked are surrounded with a conductor loop $19_1$ to $19_m$, such that when current is flowing through the conductor loop $19_1$ to $19_m$, an alternating magnetic field 22 arises within that storage area $12_1$ to $12_n$ which is to be monitored for the sub-process and is to be demarcated from other storage areas $12_1$ to $12_n$. The alternating magnetic field 22 may be generated by an unbalanced signal shape (unbalanced current path) at a base frequency $f_g$ (see FIG. 4f). For the purpose of further distinction, but also for data transmission, this field-generating signal may be modulated by means of a suitable method (amplitude, frequency, or phase modulation). Thus, a possibility of distinguishing between different conductor loops $19_1$ to $19_m$, with differently modulated signals is provided. The signal running through the conductor loop $19_1$ to $19_m$, is generated by the pertinent base station. FIG. 2 shows such a setup by using the example of a rack.

If the order-picking person with the mobile terminal (receiver system) 32 penetrates a storage area $12_1$ to $12_n$ monitored by the system 10 by means of the magnetic field 22 during the order-picking process, the monitoring signal sent by the base station 17 via the conductor loop $19_1$ to $19_m$, will be detected and processed by the receiver system 32. To this end, the receiver system 32 may be configured as a watch, for example, or may be integrated into a glove or a piece of clothing of the executing person (see FIG. 2). Following reception and evaluation of the monitoring signal, the receiver system 32 may optically, acoustically, or mechanically signal to the operating person the correctness or incorrectness of the action performed in the monitored storage area $12_1$ to $12_n$. To this end, previous training of the system 10 or a data link to process monitoring may be employed.

Figure 3:
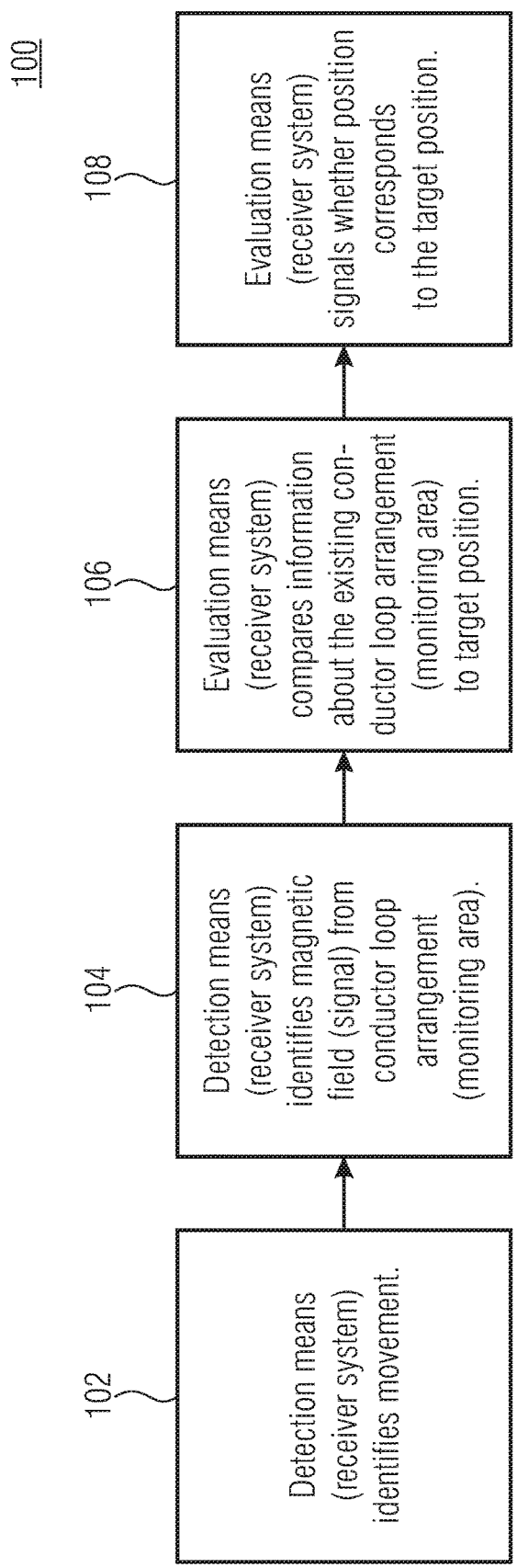
FIG. 3 shows a flowchart of the mode of operation of the device, shown in FIGS. 1 and 2, for monitoring access to a storage area of a plurality of storage areas for goods, in accordance with an embodiment.

FIG. 3 shows a flow chart 100 of the mode of operation of the device 10, shown in FIGS. 1 and 2, for monitoring access to a storage area of a plurality of storage areas 12 for goods.

In a first step 102, the mobile terminal (or receiver system) 32 may identify a movement. The identification of the movement may occur, e.g., by means of a sensor such as a vibration sensor, motion sensor, and/or inertial sensor, for example. The sensor may provide, at its output, a sensor signal by means of which a movement of the mobile terminal 32 and, thus, seizing or depositing of goods in a storage area $12_1$ to $12_n$ of the plurality of storage areas 12 can be detected. The sensor signal may display an acceleration or direction of motion, for example, as a result of which the movement of the mobile terminal 32 may be identified.

In a second step 104, the detection means 26 of the mobile terminal 32 may identify that magnetic field 22 of a conductor loop $19_1$ to $19_m$, of the conductor loop arrangement 18 which is associated with one of the storage areas $12_1$ to $12_n$, and may provide a corresponding measurement signal 28. As was already mentioned, each conductor loop $19_1$ to $19_m$, of the conductor loop arrangement 18 may generate a specific magnetic field 22 which may be detected by the detection means 26 and be converted to a corresponding specific measurement signal 28.

In a third step 106, the evaluation means 30 of the mobile terminal 32 may compare information about the existing conductor loop arrangement 18 (monitoring area) to a target position. As was already mentioned, the evaluation means 30 may detect the instance of access to one of the storage areas $12_1$ to $12_n$ on account of the measurement signal 28. To this end, the evaluation means 30 may analyze the measurement signal 28 so as to ascertain from which conductor loop $19_1$ to $19_m$, of the conductor loop arrangement 18 the magnetic field 22 that was detected by the detection means 26 originates. The evaluation means 30 decides, as a function of the measurement signal 28, within or outside of which of the conductor loops $19_1$ to $19_m$, of the conductor loop arrangement 18 the detection means 26 is located, or which of the conductor loops $19_1$ to $19_m$, have been crossed over by the detection means 26. Thus, the evaluation means 30 may determine the position of the detection means 26 in relation to the conductor loops $19_1$ to $19_m$, of the conductor loop arrangement 18 and, thus, in relation to the storage areas $12_1$ to $12_n$.

In a fourth step 108, the evaluation means 30 of the mobile terminal, or receiver system, 32 may signal whether the position of the mobile terminal 32 corresponds to the target position. To this end, the evaluation means 30 may be configured to compare the determined instance of access to the storage area $12_1$ to $12_n$ with a target access instance, and to output, on the basis of the comparison, a display signal 34 which may indicate whether or not the determined instance of access and the target access instance coincide, i.e. whether or not the goods were retrieved from the correct storage area $12_1$ to $12_n$ of the plurality of storage areas 12 and/or were deposited into the correct storage area $12_1$ to $12_n$ of the plurality of storage areas 12.

In addition, it is possible to detect, e.g. by means of motion detectors within the mobile terminal 32, a movement and to further determine the position of the mobile terminal 32 on the basis of the detected movement. For example, it is possible to calculate a current position of the mobile terminal 32 on the basis of a known starting point and the detected movement, which may be described, e.g., by means of directions extending along a predefined coordinate system. Thus, the evaluation means 30 has additional information about the position of the mobile terminal 32 available to it which may be compared to the measurement signal 28 of the detection means 26.

By means of motion analyses performed on the basis of sensor values, specific activities such as seizing or depositing an object may be identified. Thus, the evaluation means 30 may assess more accurately whether an instance of access to a predefined storage area $12_1$ to $12_n$ has actually taken place. For this purpose, previous training of the monitoring device 10 or a data link for process monitoring may be useful.

Motion detectors additionally allow reducing the energy requirement e.g. of the mobile terminal 32 or of the magnetic field generation means 14. For example, energy may be saved for the time period during which the motion detector of the mobile terminal 32 detects no motion, e.g. in that components that are not needed, such as the detection means 26 or the signal source 16, are deactivated.

Moreover, an increased electrical AC signal 20 may be supplied, on account of the calculated current position of the mobile terminal 32, to those conductor loops $19_1$ to $19_m$, of the conductor loop arrangement 18 which are located in the vicinity of the mobile terminal 32. This has the advantage that a stronger magnetic field 22 is generated within those conductor loops $19_1$ to $19_m$, of the conductor loop arrangement 18 which are located in the vicinity of the mobile terminal 32. Thus, the detection means 26 may detect a higher signal level of the magnetic field 22. In addition, fewer superpositions of the emitted magnetic fields 22 of the different conductor loops $19_1$ to $19_m$, may occur within the conductor loop arrangement 18 since certain conductor loops $19_1$ to $19_m$, generate less intense magnetic fields 22. Additionally, the energy efficiency of the device or system 10 may thereby be increased.

In other words, FIG. 3 shows the entire process chain 100 for the order-picking system 10 comprising electronic support. The electronics of the order-picking system 10, in particular of the receiver system 32, may additionally be extended by an additional sensor system (e.g. vibration sensors, motion sensors, inertial sensor system). In this manner, the system 10 obtains additional information about standstill or motion. This enables the receiver system 32 to save energy since it need not operate during idle phases. In addition, specific activities such as seizing or depositing an object may be identified by means of motion analyses on a sensor value basis, and may trigger actions of the receiver system 32, for example monitoring signal analysis or a data link to the base station 17.

The above-described device 10 for monitoring access to a storage area $12_1$ to $12_n$ of a plurality of storage areas 12 for goods thus allows providing the order-picker with direct feedback concerning the correct process flow while he/she is doing his/her work. As a result, erroneous order-picking, i.e. retrieval of goods from the wrong storage area $12_1$ to $12_n$ or deposition of goods into a wrong storage area $12_1$ to $12_n$, may be identified and signaled. This may be effected by means of optical, acoustic or mechanical signaling, specifically in a manner which does not interfere with or change the actual process flow.

Thus, the device 10 simplifies order-picking of goods, objects as well as sorting of objects. Embodiments of the device 10 additionally provide a simple technical solution for supporting the sorting and order-picking task, which moreover can easily be integrated into existing work processes.

In addition to the monitoring of storage areas $12_1$ to $12_n$ with goods in order-picking tasks, the above-described area monitoring by means of conductor loops $19_1$ to $19_m$, and the magnetic field generated as a result may be applied in many fields. Conceivable applications are access monitoring of security areas, e.g. when operating machines with danger zones. Also, it is possible to allocate passages of gates to specific objects. With the present system 10 it is moreover possible to allocate the position of a receiver system 32 with regard to a conductor 19, which carries current in a suitable manner, to one side of the conductor (to the left of, to the right of, or directly above the conductor). Thus, it is possible to find a conductor 19 as well as to detect overstepping of a line marked by said conductor 19.

In the following, the physical backgrounds used by the device 10 for monitoring the plurality of storage areas 12 will be described. These include the characteristic magnetic field 22 generated by a conductor loop 19, or a current-carrying conductor 19, as well as detection and evaluation thereof.

Figure 4A:
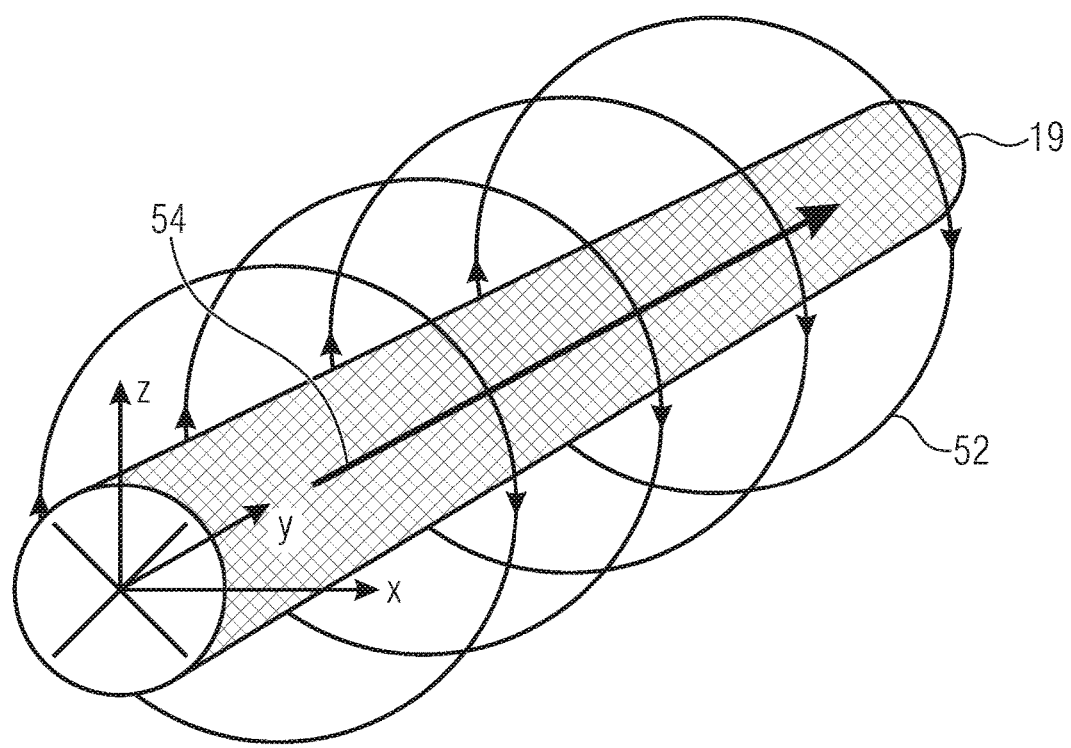
FIG. 4a shows a schematic view of a current-carrying conductor and of field lines of a magnetic field generated by the current-carrying conductor.

FIG. 4a shows a schematic view of a current-carrying conductor 19 and field lines 52 of a magnetic field generated by the current-carrying conductor 19. Moreover, FIG. 4a shows a Cartesian coordinate system comprising an x axis, a y axis, and a z axis, the current-carrying conductor 19 being arranged along the y axis, so that the current flow is also aligned with the y direction. It shall be noted that the arrangement of the current-carrying conductor 19 and the alignment of the magnetic field 52 generated by the current-carrying conductor 19, which are shown in FIG. 4a, are also applicable to FIGS. 4b to 6b with regard to the Cartesian coordinate system.

As can be seen in FIG. 4a, a current flow 54 through the conductor 19 generates a magnetic field 52 around the conductor 19. The current flow 54 through the conductor 19 may be caused, e.g., by a balanced (e.g. sinusoidal) change signal. If a measuring coil, or coil, is located within this magnetic field 52, the magnetic field 52 of the current-carrying conductor 19 will generate, or induce, a voltage within, or into, the measuring coil as a function of the inductance, quality, and position of the measuring coil in relation to the field vectors of the magnetic field 52.

Figure 4B:
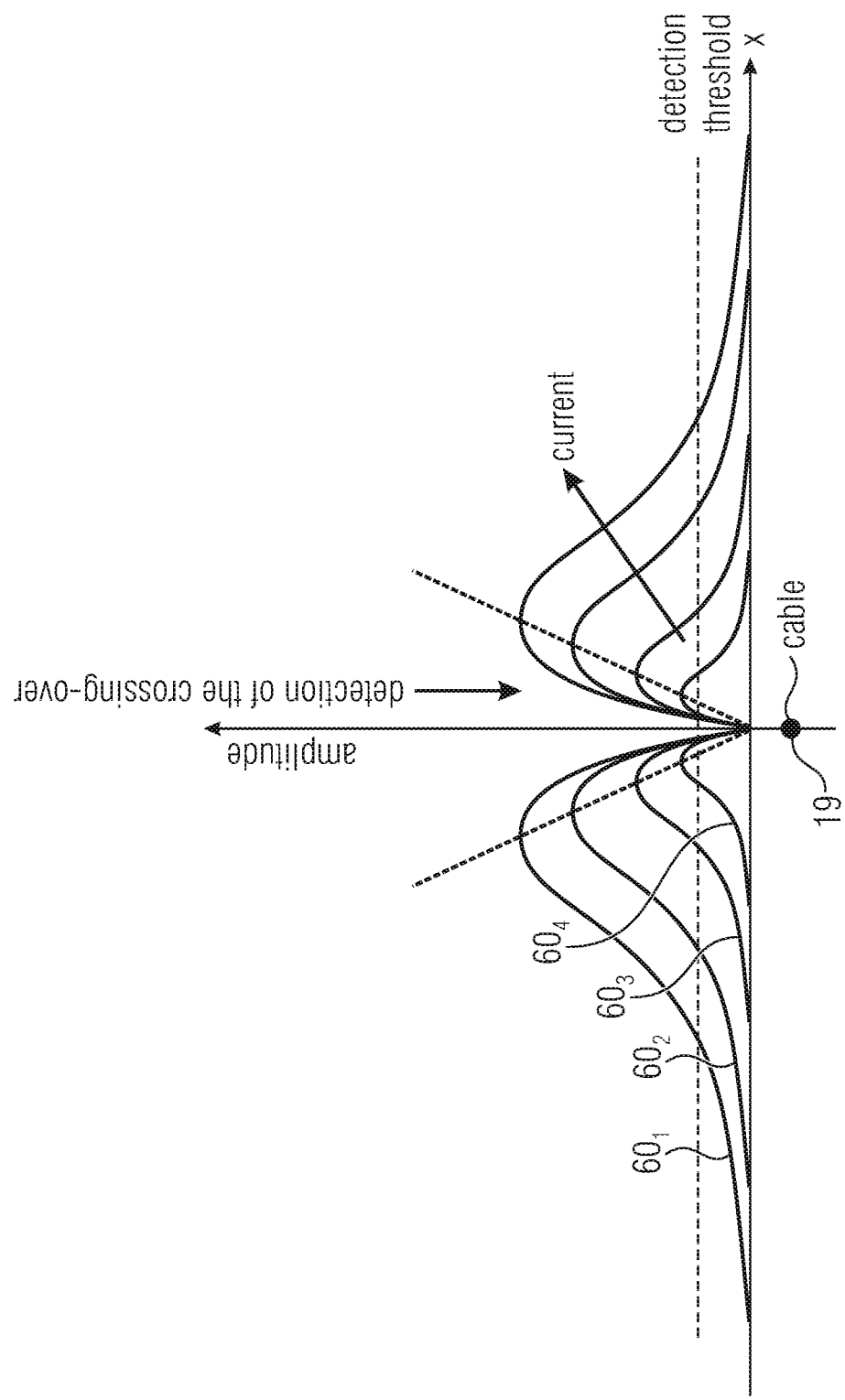
FIG. 4b shows, in a diagram for four different current intensities, four amplitude responses of magnetic field strengths of a magnetic field generated by the current-carrying conductor, as a function of a distance from the current-carrying conductor.

In a diagram for four different current intensities, FIG. 4b shows four amplitude responses $58_1$ to $58_4$ of magnetic field strengths of a magnetic field generated by the current-carrying conductor 19, as a function of a distance from the current-carrying conductor 19.

As can be seen in FIG. 4b, no signal will theoretically be induced into the measuring coil directly above the conductor 19 if the conductor direction (current vector) and the coil axis are perpendicular to each other. If the measuring coil moves perpendicularly (in parallel with the x axis) over the conductor 19 from, e.g., the left to the right, a signal with an increasing amplitude will initially be induced upon approximation to the conductor 19. However, in the immediate vicinity of the conductor 19, fewer and fewer field lines of the conductor current 54 will intersperse the measuring coil perpendicular thereto, the amplitude of the induced signal will decrease again to a minimum at which the measuring coil is directly above the conductor 19. From this point onward, as the measuring coil moves further in the same direction (in parallel with the x axis), increasing of the induced signal amplitude up to a maximum and subsequent decreasing as the distance from the conductor 19 increases can be observed. Due to the field line pattern 52 of the magnetic field around the conductor 19, however, the induced signal within the measuring coil is now inverted, i.e. a phase shift occurs, as can be seen in FIG. 4c.

Figure 4C:
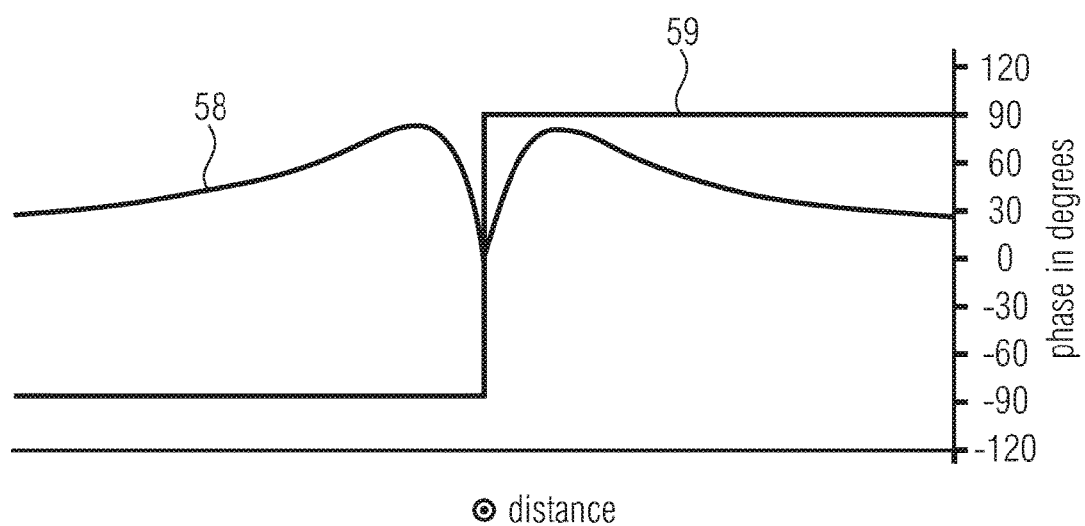
FIG. 4c shows, in a diagram, an amplitude response and a phase response of a magnetic field strength of a magnetic field generated by the current-carrying conductor, as a function of a distance from the current-carrying conductor.

In a diagram, FIG. 4c shows an amplitude response 58 and a phase response 59 of a magnetic field strength of a magnetic field generated by the current-carrying conductor 19, plotted over a distance from the current-carrying conductor 19.

It shall be noted that on account of the phase position it is also possible to determine whether or not the current-carrying conductor 19, if same is formed into a conductor loop, has been crossed through or reached through. If said conductor loop is associated with a storage area, it is thus possible to distinguish whether the (correct) storage area has been reached into through the conductor loop or whether it has been missed. The phase difference in the measurement signal amounts to about 180°, depending on whether one reaches through the plane which spans and demarcates the conductor loop or whether one reaches through the plane which spans the conductor loop and extends ad infinitum outside the conductor loop. When the (correct) storage area is reached into, the detection means thus provides a measurement signal having a first phase, whereas in case said correct storage area has been missed, a measurement signal having a second phase inverted to the first phase is provided by the detection means. Thus, the detection means may be configured, when a surface is crossed through which is spanned by the conductor loop 19 and demarcated by the conductor loop 19, to provide a measurement signal having a phase position, and when the same surface outside the conductor loop is crossed through (reached through), to provide a measurement signal having a different phase.

By observing the waveform, shown in FIGS. 4b and 4c, within the measuring coil, the process of crossing a current-carrying conductor 19 is detectable. This would presuppose synchronization of the transmitter and the receiver, that is, the receiver should know the emitted phase of the transmitter in order to identify the phase shift accompanying an amplitude dip. Possibilities for such carrier phase determination will be explained below.

Figure 4D:
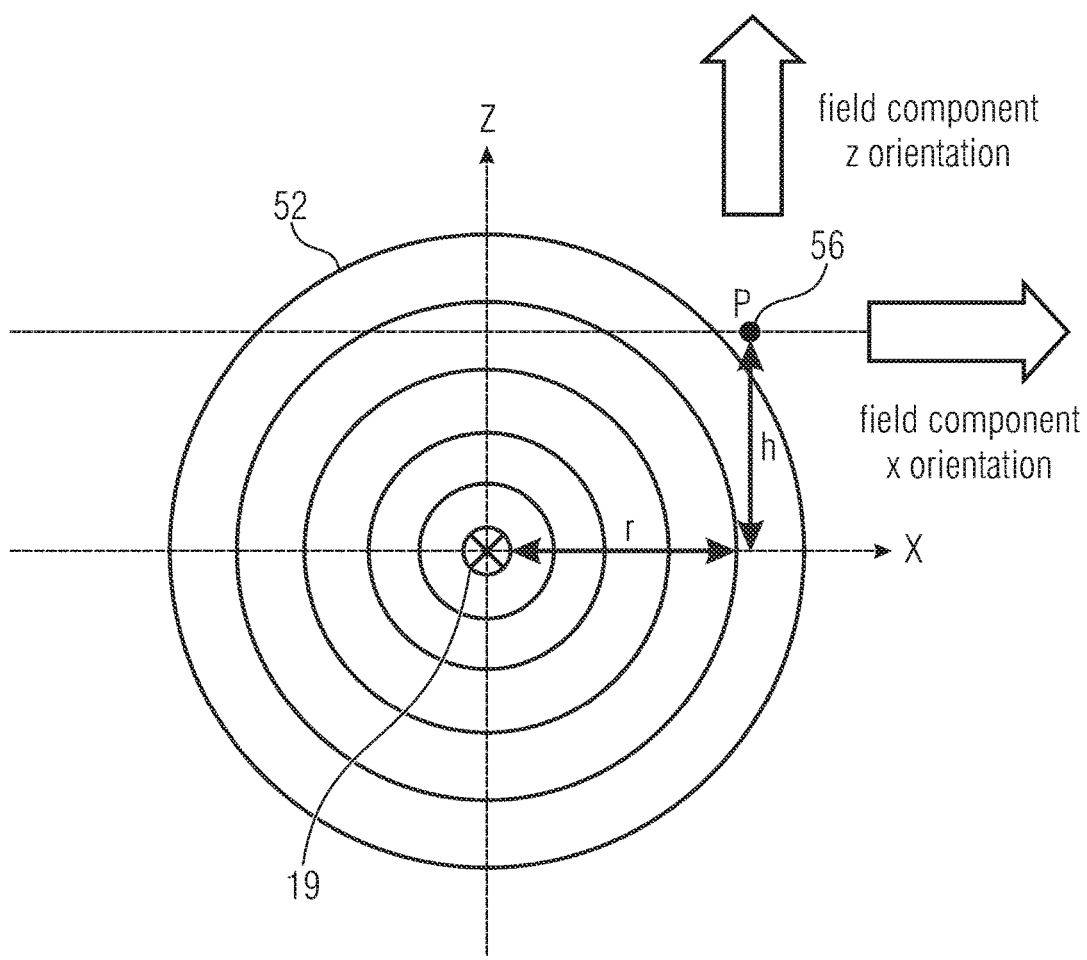
FIG. 4d shows a schematic view of the current-carrying conductor, field lines of a magnetic field generated by the current-carrying conductor, and field components in x and z directions at a predefined position relative to the current-carrying conductor.

FIG. 4d shows a schematic view of the current-carrying conductor 19, field lines 52 of a magnetic field generated by the current-carrying conductor 19, and field components at a position (P) 56 in the x and z directions.

FIG. 4d elucidates that the magnetic field generated by the current-carrying conductor 19 comprises both an x field component (or x component) and a z field component (or z component) at the position (P) 56. The position (P) in relation to the current-carrying conductor 19 may be described by means of a distance r along the x axis and of a distance h along the z axis.

As has already been mentioned and as was shown in FIG. 4c, a phase shift occurs when the current-carrying conductor 19 is crossed over. The change in the phase position may be determined by means of a perpendicular measuring coil introduced into the magnetic field. The measuring coil may be arranged such that it detects a z component of the magnetic field.

When a sinusoidal alternating current flowing through the conductor 19 is assumed, a sinusoidal magnetic flow results which causes a cosinusoidal measuring voltage within the measuring coil, the maximum value of said voltage depending on the distance of the measuring coil from the conductor 19.

When the current-carrying conductor 19 is crossed over, the voltage induced into the measuring coil will be inverted (i.e. phase change by 180°). This phase shift that has occurred upon crossing-over of the current-carrying conductor 19 may be evaluated for detecting the crossing, or crossing over, of the current-carrying conductor 19. However, it is useful for this purpose to know the reference phase (i.e. the current phase position) or to evaluate the phase difference between two coils (i.e. the measuring coil and a reference coil).

The reference phase may be provided by an external reference transmitter, for example. Another possibility is to directly modulate the reference phase onto the AC signal fed into the conductor 19. In this context, the phase position (of the carrier wave) may also be directly integrated into the AC signal (carrier signal) by means of amplitude modulation or frequency modulation. This may be effected, e.g., by dividing the carrier frequency by a fixed factor and by subsequently performing modulation at this frequency. Within the receiver (mobile terminal 32), a PLL (phase locked loop) may be synchronized onto the modulation, and subsequent multiplication by the previous factor may take place. When comparing between the demodulated and the actual phase, a statement may be made about the phase relation between the emitted and received phases, for in an inversion of the carrier signal, the demodulated and multiplied frequency remains in phase.

A further possibility is to not determine the carrier phase but to compare the phase of the measuring coil (z coil) to a second coil, or reference coil, as will be explained by means of FIG. 4e below.

Figure 4E:
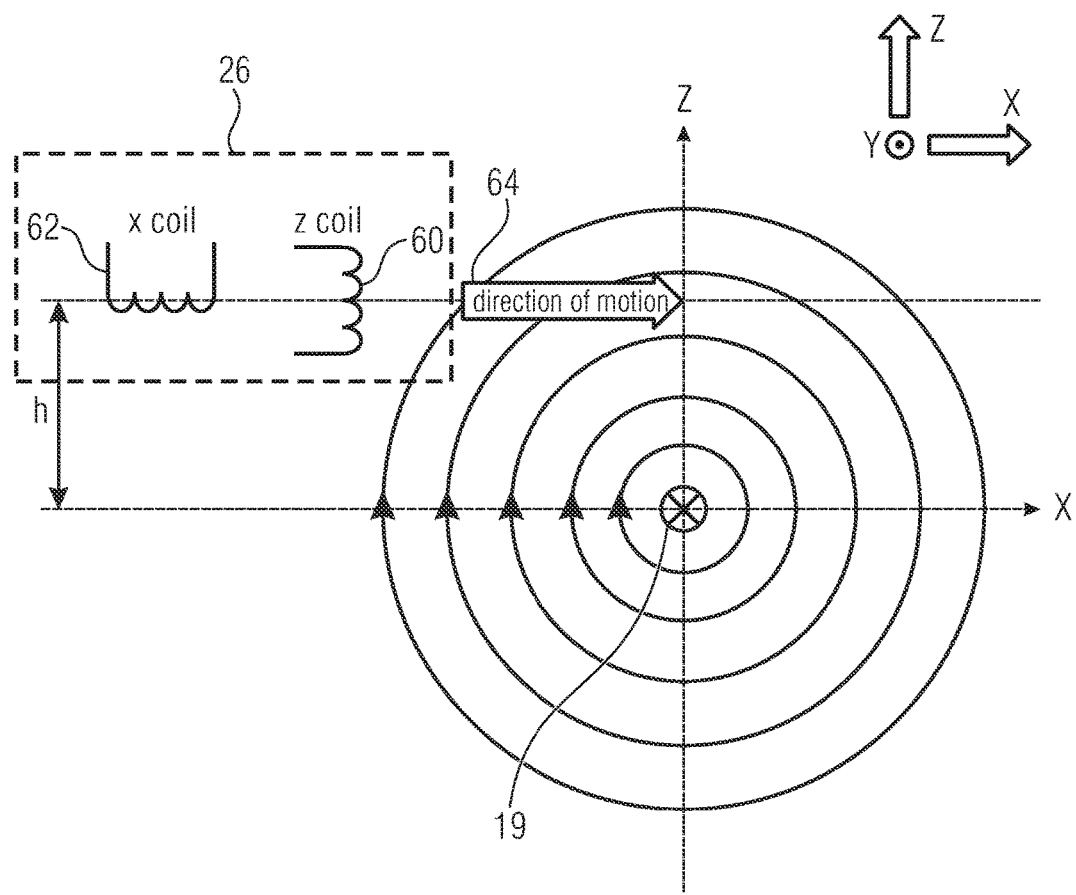
FIG. 4e shows a schematic view of the current-carrying conductor, field lines of a magnetic field generated by the current-carrying conductor, a measuring coil for detecting a first component of the magnetic field, and a reference coil for detecting a second component of the magnetic field.

FIG. 4e shows a schematic view of the current-carrying conductor 19, field lines 52 of a magnetic field generated by the current-carrying conductor 19, a measuring coil 60 for detecting a first component of the magnetic field (e.g. z component), and a reference coil 62 for detecting a second component (e.g. x component) of the magnetic field.

In addition, FIG. 4e shows a direction of motion 64 of the measuring coil 60 and of the reference coil 62, which extends in parallel with the x axis.

The mobile terminal 32 and/or the detection means 26 may comprise the measuring coil 60 and the reference coil 62.

No phase shift should occur in the comparison coil or reference coil 62 when the current-carrying conductor 19 is crossed. As is shown in FIG. 4e, one possibility is to arrange the reference coil 62 such that it detects an x component of the magnetic field.

The mobile terminal 32 and/or the detection means 26 may further comprise a second reference coil for detecting a y component of the magnetic field so as to identify a rotation in the z axis and/or a crossing-over at a very flat angle.

A possible rotation of the electronic measuring equipment (i.e. of the measuring coil (z coil) and the reference coils (x coil and y coil)) during the crossing-over of the current-carrying conductor 19 may result in ambiguity since here the phases change in the first reference coil (x coil) or the second reference coil (y coil).

Figure 4F:
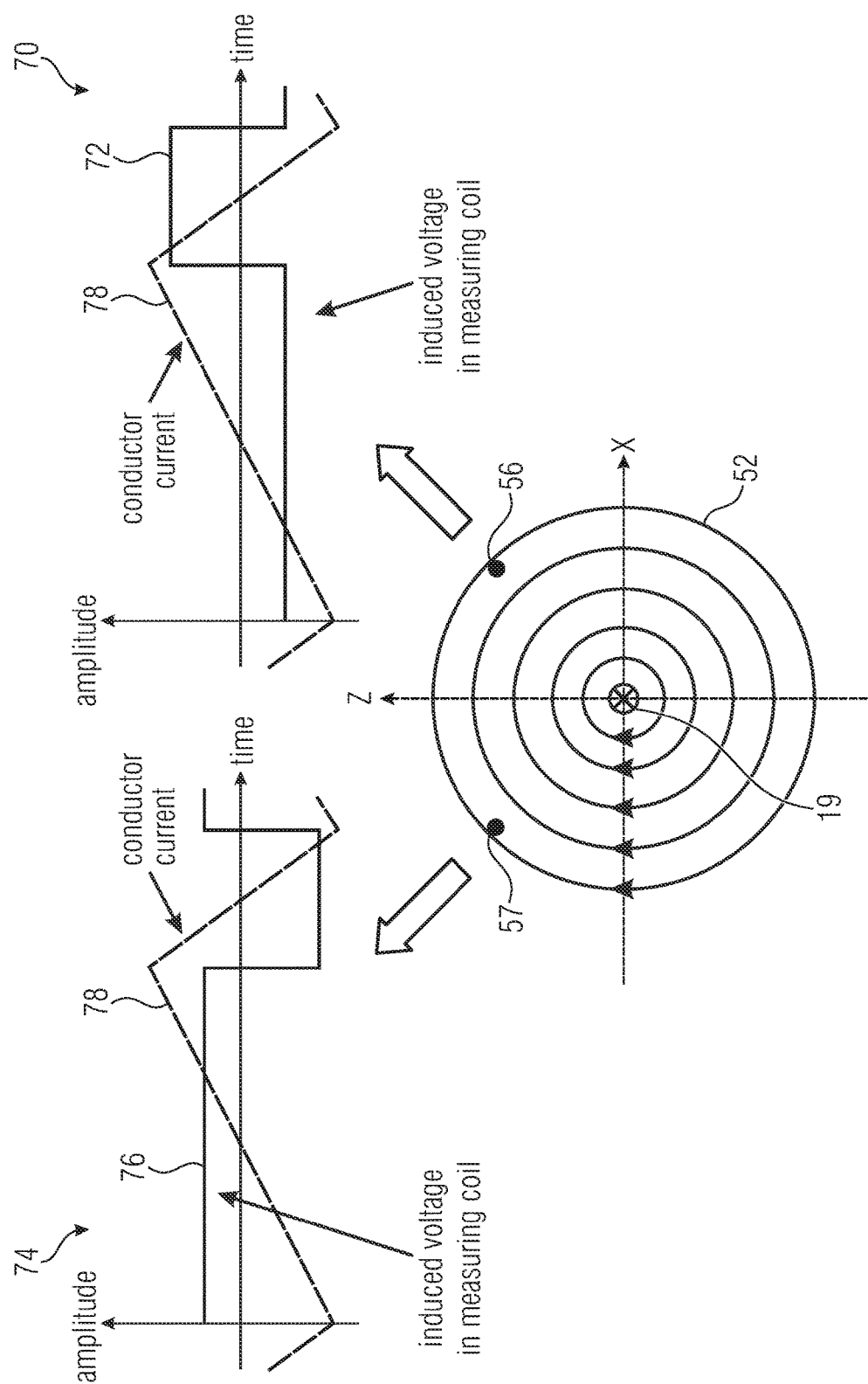
FIG. 4f shows a schematic view of the current-carrying conductor, field lines of the magnetic field generated by the current-carrying conductor, as well as, in a first diagram, a curve of a voltage, plotted over time, that has been induced into the measuring coil at a first position of the measuring coil relative to the current-carrying conductor, and, in a second diagram, a curve of a voltage, plotted over time, that has been induced into the measuring coil at a second position of the measuring coil relative to the current-carrying conductor.

FIG. 4f shows a schematic view of the current-carrying conductor 19, field lines 52 of the magnetic field generated by the current-carrying conductor 19, as well as, in a first diagram 70, a curve 72 of a voltage induced into the measuring coil 60 at a first position 56 of the measuring coil 60, plotted over time, and in a second diagram 74, a curve 76 of a voltage induced into the measuring coil 60 at a second position 57 of the measuring coil 60, plotted over time. In addition, a curve 78 of the current flowing through the conductor 19 is marked in the first diagram 70 and the second diagram 72.

As can be seen from FIG. 4f, depending on the position 56 or 57 of the measuring coil 60 that is oriented in the z direction (see FIG. 4e), a different characteristic voltage 72 and 76 is induced into the measuring coil 60 in relation to the current-carrying conductor 19 when, e.g., an unbalanced signal (AC signal) such as a triangular signal, for example, is used. A possible evaluation method within a circuit is time measurement between rising and falling edges of the curves 72 and 76, shown in FIG. 4f, of the voltages induced into the measuring coil 60.

Moreover, it is possible to route signals over a Schmitt Trigger and to subsequently make a clear association of the coil signal with a conductor side by integrating the induced coil signal and by means of a comparison with a mean value of the received signal since due to the phase shift, a smaller integration value will result on the one conductor side (e.g. first position 56) than on the other conductor side (e.g. second position 57).

Figure 5A:
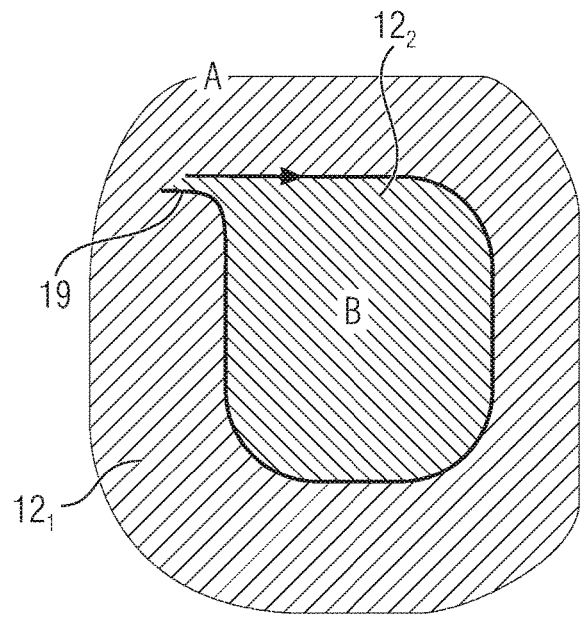
FIG. 5a shows a schematic view of an arrangement of a conductor loop, in accordance with an embodiment.

FIG. 5a shows a schematic view of an arrangement of a conductor loop 19, in accordance with an embodiment. The conductor loop 19 shown in FIG. 5a comprises two monitoring areas $12_1$ (A) and $12_2$ (B). A first (outer) monitoring area $12_1$ (A) of the two monitoring areas $12_1$ (A) and $12_2$ (B) may be located outside the conductor loop. A second (inner) monitoring area $12_2$ (B) may be (almost) completely enclosed by the conductor loop 19. The conductor loop 19 may have any shape, such as a round, triangular or quadrangular shape.

Figure 5B:
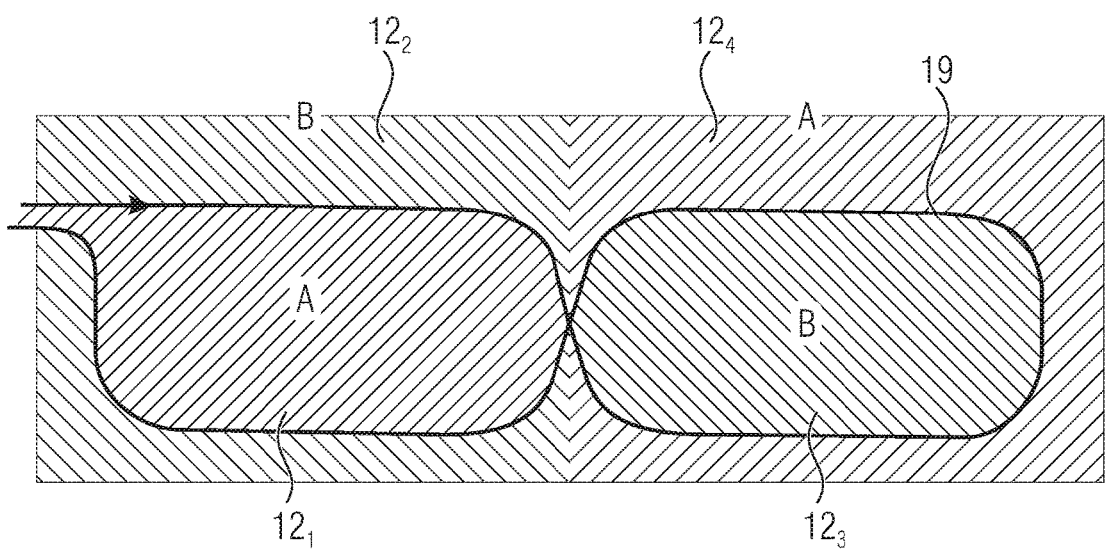
FIG. 5b shows a schematic view of an 8-shaped arrangement of a conductor loop, in accordance with an embodiment.

FIG. 5b shows a schematic view of an 8-shaped arrangement of a conductor loop 19 of the conductor loop arrangement 18, in accordance with an embodiment. The conductor loop 19 comprises four monitoring areas $12_1$ to $12_4$. A first pair of monitoring areas $12_1$ and $12_3$ of the four monitoring areas $12_1$ to $12_4$ is enclosed by the conductor loop 19, whereas a second pair of monitoring areas $12_2$ and $12_4$ of the four monitoring areas $12_1$ to $12_4$ is located outside the conductor loop 19. The phase location of the monitoring areas $12_1$ and $12_4$ (A) and the phase position of the monitoring areas $12_2$ and $12_3$ (B) coincide, the phase positions between the two enclosed monitoring areas $12_1$ and $12_3$ and of the two outer monitoring areas $12_2$ and $12_4$ being opposed to each other in each case.

Figure 5C:
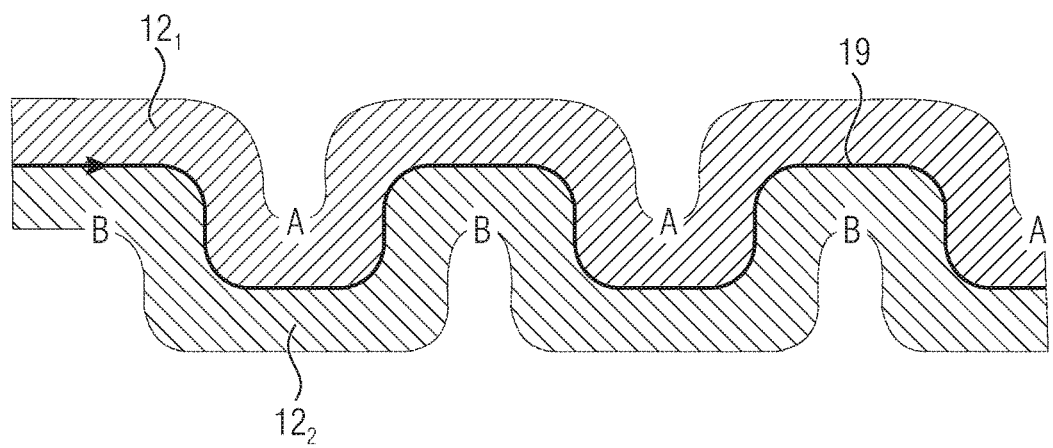
FIG. 5c shows a schematic view of a meandering arrangement of a conductor loop, in accordance with an embodiment.

FIG. 5c shows a schematic view of a meandering arrangement of a conductor loop 19, in accordance with an embodiment. As can be seen in FIG. 5c, the first and second monitoring areas $12_1$ and $12_2$ alternate along the arrangement of the meandering conductor loop 19. Due to this arrangement it is possible to monitor linear movements along the arrangement of the meandering conductor loop 19. Each time the conductor loop 19 is crossed over, the voltage induced into the measuring coil 60 exhibits a phase change, which may be evaluated by the mobile terminal 32 so as to monitor a movement of the mobile terminal 32.

Moreover, distances between opposite portions (or parts) of the conductor loop 19 along the meandering arrangement of the conductor loop 19, or, in other words, a narrow and/or wide meandering arrangement of the conductor loop 19, may represent additional information. For example, the information represented by the distance can be read out by using a mobile terminal which moves along the meandering arrangement of the conductor loop 19 at a (nearly) constant speed.

Figure 5D:
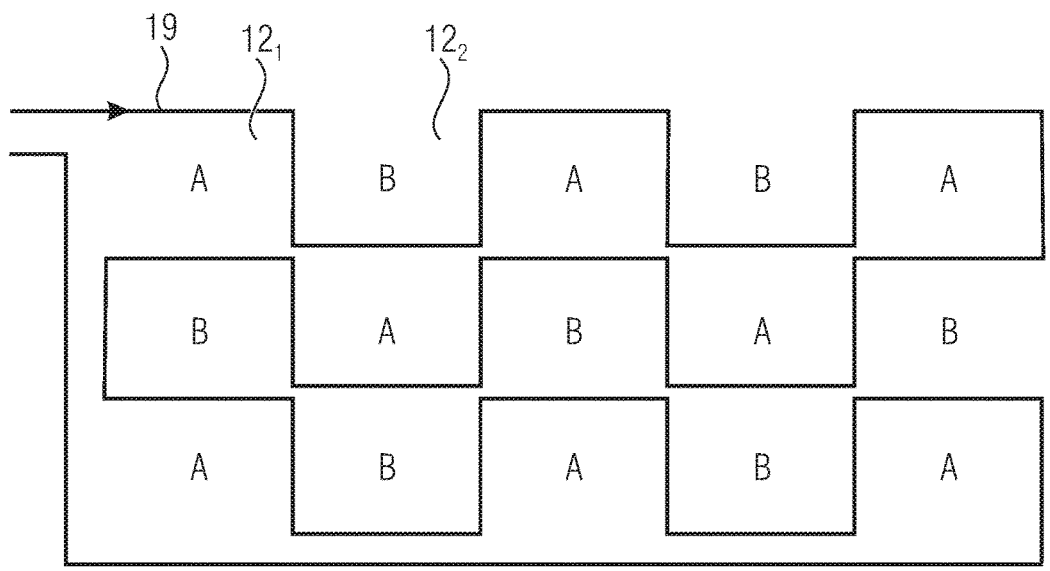
FIG. 5d shows a schematic view of a checkered arrangement of a conductor loop, in accordance with an embodiment.

FIG. 5d shows a schematic view of a checkered arrangement of a conductor loop 19, in accordance with an embodiment. The monitoring areas $12_1$ (A) and $12_2$ (B) may, as was already described with reference to FIGS. 5b and 5c, adopt two states in relation to the phase position 64. Mutually adjacent monitoring areas $12_1$ (A) and $12_2$ (B) exhibit different phase positions in each case.

Figure 5E:
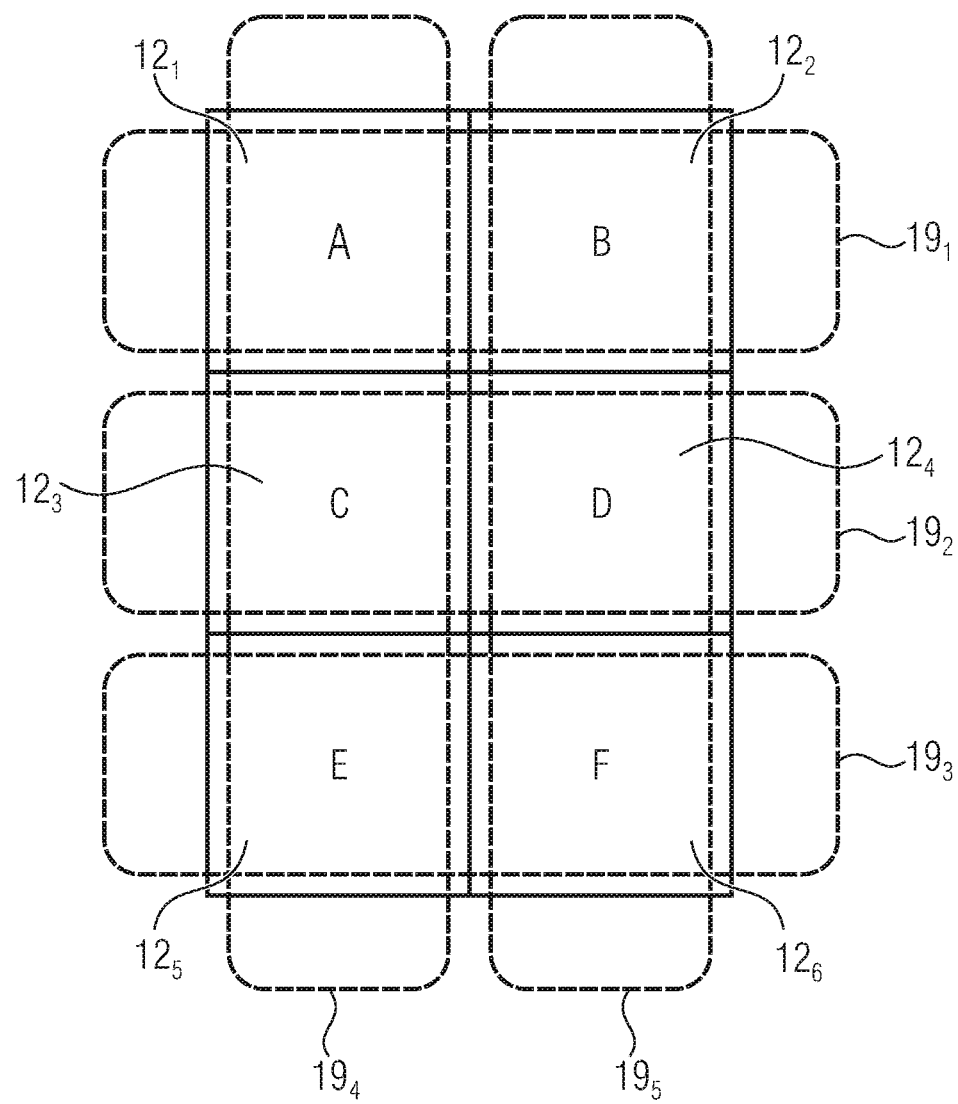
FIG. 5e shows a schematic view of six storage areas and of a conductor loop arrangement comprising five conductor loops for monitoring the six storage areas, in accordance with an embodiment.

FIG. 5e shows a schematic view of six storage areas $12_1$ to $12_6$ and of a conductor loop arrangement 18 comprising five conductor loops $19_1$ to $19_5$ for monitoring the six storage areas $12_1$ to $12_6$, in accordance with an embodiment. The six storage areas $12_1$ to $12_6$ are arranged (in the shape of a matrix) in two columns and three rows. A first conductor loop $19_1$ of the five conductor loops $19_1$ to $19_5$ is arranged to include a first row of the three rows, whereas a second conductor loop $19_2$ of the five conductor loops $19_1$ to $19_5$ is arranged to include a second row of the three rows, and whereas a third conductor loop $19_3$ of the five conductor loops $19_1$ to $19_5$ is arranged to include a third row of the three rows. A fourth conductor loop $19_4$ of the five conductor loops $19_1$ to $19_5$ is arranged to include a first column of the two columns, whereas a fifth conductor loop $19_5$ of the five conductor loops $19_1$ to $19_5$ is arranged to include a second column of the two columns.

In summary, FIGS. 5a to 5e show possible arrangements of the conductor loops 19 of the conductor loop arrangement 18. As is shown in FIG. 5a, the conductor 19 might also be configured as a meandering structure for monitoring linear movements. In case order-picking monitoring is applied, several conductors 19 comprising different signals (different frequencies or modulations) may be formed into loops 19 so as to distinguish several storage areas $12_1$ to $12_n$ from one other (see FIGS. 5b and 5d). A combination of loops $19_1$ to $19_m$, e.g. in a matrix arrangement (see FIG. 5e), may expand this system. In the simplest case, in order to monitor two areas $12_1$ to $12_n$ (n=2), a conductor 19 may be formed into an 8-shaped loop which confines the two storage areas $12_1$ to $12_n$ (n=2) to be monitored.

Figure 6A:
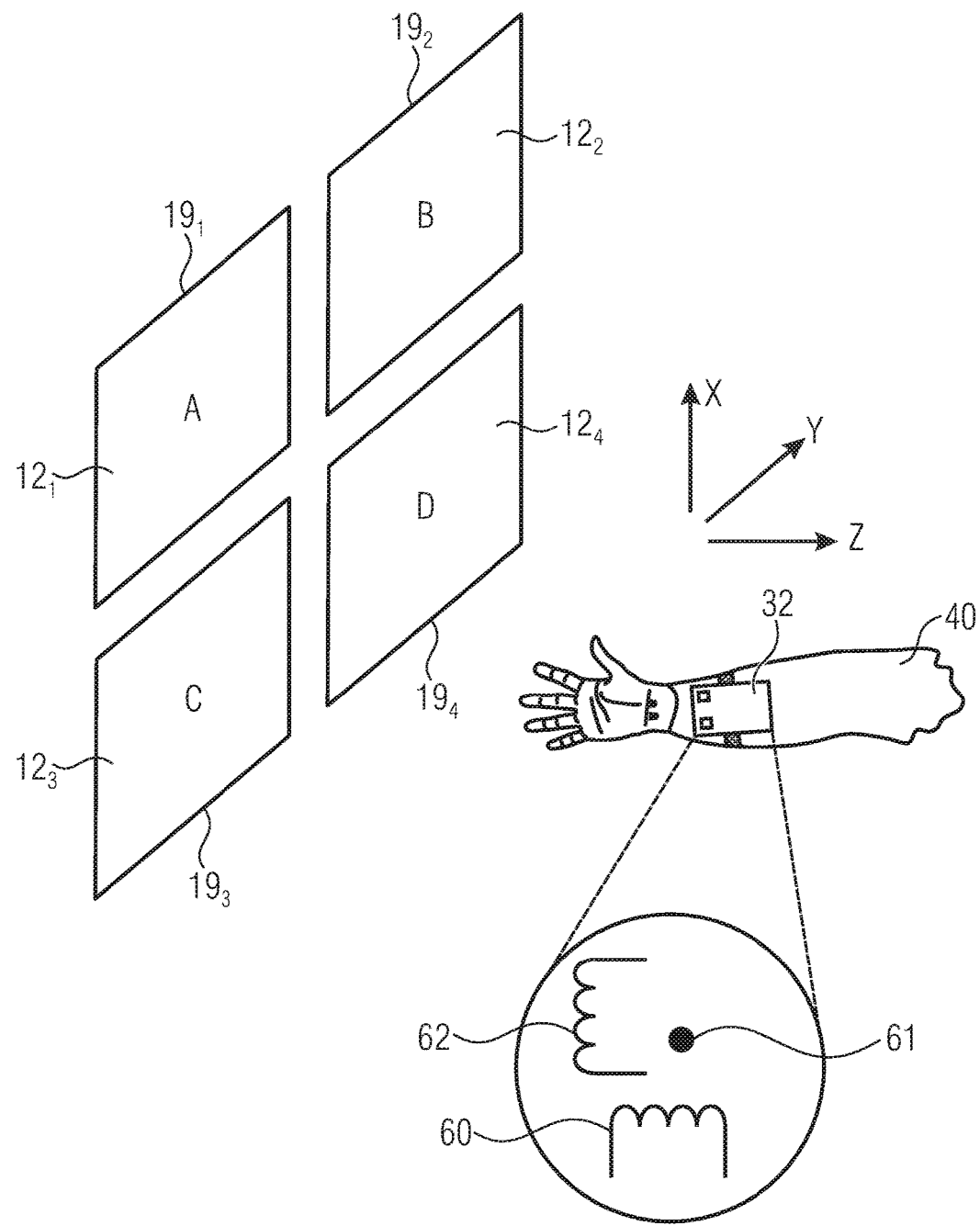
FIG. 6a shows a schematic view of a conductor loop arrangement comprising four conductor loops for monitoring four storage areas, in accordance with an embodiment.

FIG. 6a shows a schematic view of a conductor loop arrangement 18 comprising four conductor loops $19_1$ to $19_4$ for monitoring four storage areas $12_1$ to $12_n$ (A to D). The four conductor loops $19_1$ to $19_4$ may be configured in the shape of a rectangle and be arranged (in the shape of a matrix) in two rows and two columns, it being possible for the four conductor loops $19_1$ to $19_4$ to be arranged in parallel with an x-y plane of the Cartesian coordinate system.

The detection means 26 of the mobile terminal 32 may comprise, for position and direction identification, three coils 60, 61, and 62 arranged orthogonally to one another. In other words, the detection means 26 may comprise three orthogonal coils 60, 61, and 62 in the x, y, and z directions for position and direction identification.

Figure 6B:
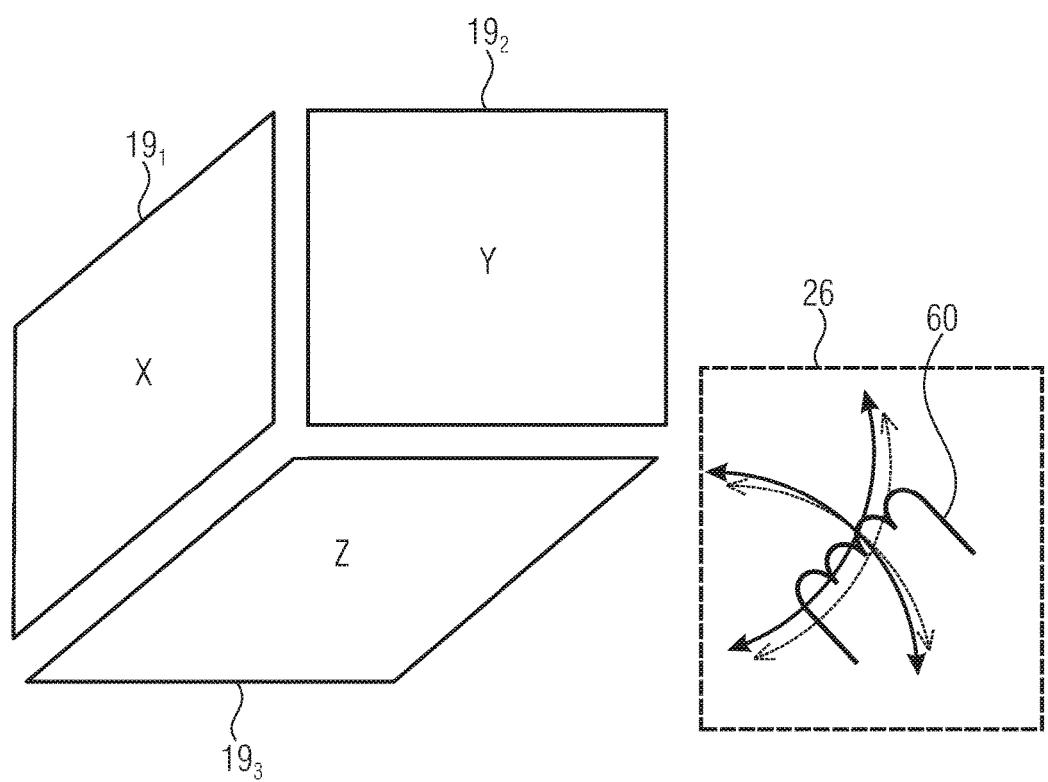
FIG. 6b shows a schematic view of three conductor loops and of a detection means, which comprises a measuring coil, of a mobile terminal, in accordance with an embodiment.

FIG. 6b shows a schematic view of three conductor loops $19_1$ to $19_3$ and of a detection means 26 of a mobile terminal 32, said detection means 26 comprising a coil 60. In other words, FIG. 6b shows an orientation estimation with three exciting coils $19_1$ to $19_3$ and a sensor coil 60.

The three conductor loops $19_1$ to $19_3$ may have the shape of a rectangle and be arranged orthogonally to one another, i.e. planes spanned by the three conductor loops $19_1$ to $19_3$ are arranged orthogonally to one another.

In other words, both a receiver coil and a conductor/conductor loop may be configured for any directions in space. On the one hand, the orientation estimation is possible by means of three orthogonal sensor coils 60, 61, and 62, as is shown in FIG. 6a, or it is also possible, on the other hand, by three orthogonal exciting coils $19_1$ to $19_3$ and a sensor coil 60, as is shown in FIG. 6b.

The above-described illustrations allow determining the position of a receiver system 32 in relation to a current-carrying conductor 19, or a current-carrying conductor loop 19, in absolute terms. Thereby it is possible to perform exact positional evaluations on the basis of radio technology without requiring any further reference signals. This can be used, in particular, to verify during order-picking (by using the above-described device 10) whether or not the order-picker has reached into the correct storage area 12 (e.g. into the correct storage shelf).

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed by a hardware device (or by using a hardware device) such as a microprocessor, a programmable computer, or an electronic circuit, for example. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM, or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier. In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example.

The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for monitoring access to a storage area of a plurality of storage areas for goods, the device comprising:
    a measurement signal generator comprising a signal source and a conductor loop arrangement, the conductor loop arrangement being arranged to generate a magnetic field on account of an electrical AC signal, each of the storage areas having at least one conductor loop of the conductor loop arrangement associated with it, and the signal source being configured to supply a characteristic electrical AC signal to each conductor loop of the conductor loop arrangement;
    a detector for detecting the generated magnetic field and for providing a measurement signal on the basis of the detected magnetic field; and
    an evaluator for evaluating the measurement signal provided by the detector, the evaluator being configured to determine an instance of access to one of the storage areas on the basis of the measurement signal, to compare a determined instance of access with a target access instance, and to output a display signal on the basis of the comparison.

2. The device as claimed in claim 1, wherein at least two conductor loops of the conductor loop arrangement have different AC signals associated with them.

3. The device as claimed in claim 1, wherein the display signal displays a first state when the comparison shows that the target access instance and the detected access instance coincide, and wherein the display signal displays a second state when the comparison shows that the target access instance and the detected access instance do not coincide.

4. The device as claimed in claim 1, wherein the display signal is an optical signal, an acoustic signal, a haptic signal, or a mechanical signal.

5. The device as claimed in claim 1, wherein the evaluation of the measurement signal shows whether the detector is located within or outside the conductor loop.

6. The device as claimed in claim 1, wherein the evaluator is configured to detect an amplitude and/or a phase position of the measurement signal so as to determine the position of the detector in relation to the conductor loop.

7. The device as claimed in claim 6, wherein the evaluator is configured to detect crossing-through of a surface, which is spanned by the conductor loop and demarcated by the conductor loop, by means of a phase position of the measurement signal, the measurement signal comprising a first phase position when the first surface is crossed through, and the measurement signal comprising a second phase position that is different from the first phase position when a second surface, which is spanned by the conductor loop and surrounds the first surface, is crossed through.

8. The device as claimed in claim 1, wherein a linear movement of the detector is detectable by a meandering arrangement of the conductor loop.

9. The device as claimed in claim 1, wherein the electrical AC signal is an unbalanced signal.

10. The device as claimed in claim 1, wherein the electrical AC signal is an unequal or an unbalanced triangular signal.

11. The device as claimed in claim 1, wherein the measurement signal generator is configured to supply an amplitude-modulated, frequency-modulated, or phase-modulated electrical AC signal to each conductor loop of the conductor loop arrangement.

12. The device as claimed in claim 11, wherein the measurement signal generator is configured to supply AC signals to at least two conductor loops of the conductor loop arrangement such that the AC signals can be distinguished by means of the modulation.

13. The device as claimed in claim 1, the device comprising a vibration sensor, motion sensor, and/or inertial sensor configured to detect a movement of the detector, and the device being configured to identify a seizing or depositing of the goods on the basis of the detected movement of the detector.

14. The device as claimed in claim 1, wherein several conductor loops that are at least partly superimposed on one another are arranged which are fed by different electrical AC signals.

15. The device as claimed in claim 1, wherein three conductor loops are arranged essentially orthogonally to one another so as to detect an access instance in three-dimensional space.

16. The device as claimed in claim 1, wherein the detector comprises at least two measuring coils for detecting the generated magnetic field, the at least two measuring coils being arranged essentially orthogonally to one another.

17. A method of monitoring access to a storage area of a plurality of storage areas for goods, wherein each storage area has at least one conductor loop of a conductor loop arrangement associated with it, the conductor loop arrangement being arranged to generate a magnetic field on account of an electrical AC signal, the method comprising:
   supplying a characteristic electrical AC signal to each conductor loop of the conductor loop arrangement so as to generate the magnetic field;
   detecting the magnetic field and providing a measurement signal on the basis of the detected magnetic field; and
   evaluating the provided measurement signal so as to determine an instance of access to one of the storage areas on the basis of the measurement signal, to compare a determined instance of access to a target access instance, and to output a display signal on the basis of the comparison.

18. A non-transitory digital storage medium having computer-readable code stored thereon to perform the method as claimed in claim 17, when said storage medium is run by a computer.

\* \* \* \* \*